United States Patent [19]

Ohmura et al.

[11] Patent Number: 5,078,225

[45] Date of Patent: Jan. 7, 1992

[54] ELECTRIC POWER STEERING SYSTEM

[75] Inventors: Hiroshi Ohmura, Higashihiroshima; Takashi Nakashima, Hiroshima, both of Japan

[73] Assignee: Mazda Motor Corporation, Hiroshima, Japan

[21] Appl. No.: 689,109

[22] Filed: Apr. 24, 1991

Related U.S. Application Data

[63] Continuation of Ser. No. 391,041, Aug. 9, 1989, abandoned.

[30] Foreign Application Priority Data

Aug. 18, 1988 [JP] Japan .................. 63-205086

[51] Int. Cl.⁵ .................. B62D 5/04; B62D 5/30
[52] U.S. Cl. .................. 180/133; 180/79.1
[58] Field of Search .................. 180/79.1, 133

[56] References Cited

U.S. PATENT DOCUMENTS 4,189,024  2/1980  Jablonsky .................. 180/133
4,664,211  5/1987  Oshita et al. .................. 180/142

FOREIGN PATENT DOCUMENTS 38263    2/1985   Japan .................. 180/79.1
2204006 11/1988  United Kingdom .................. 180/79.1

*Primary Examiner*—Charles A. Marmor
*Assistant Examiner*—Alan M. Kager
*Attorney, Agent, or Firm*—Fleit, Jacobson, Cohn, Price, Holman & Stern

[57] ABSTRACT

A system having a motor operatively connected to a steering system for reducing the steering effect is provided with a steering torque sensor for detecting steering torque in the steering system during a steering operation, an alternator output level sensor for detecting the output level of an engine driven alternator, and an ignition key switch sensor. In response to the output signal of the steering torque sensor, an assist signal is provided. In response to the output level of the alternator output level sensor and the position of the ignition key switch, an engine stall condition is detected. When engine stall occurs, the output torque of the motor is controlled in response to the assist signal for a predetermined period.

9 Claims, 7 Drawing Sheets

ELECTRIC POWER STEERING SYSTEM

This is a continuation of application Ser. No. 07/391,041, filed Aug. 9, 1989 now abandoned.

BACKGROUND OF THE INVENTION

1. Field of the Invention

The present invention relates to an electric power steering system for a vehicle, and, more particularly, to a system for controlling a motor in accordance with the turning of a steering wheel.

2. Description of the Prior Art

Conventionally, in order to reduce the driver's steering effort, it is known for a vehicle to have an electric power steering system. For example, U.S. Pat. No. 4,664,211 discloses that an electric power steering system having a torsion torque sensor for measuring torsion torque in a steering shaft is adapted to control the rotational direction and torque of a motor depending on the output signal of the sensor.

In order to significantly reduce the consumption of battery power, control of the electric power steering system is carried out only when the engine is operated and an alternator is driven by the engine. Therefore, if engine stall occurs in the vehicle running condition, steering torque is rapidly increased. This rapid increment of the steering torque is not desirable for steering the vehicle.

SUMMARY OF THE INVENTION

It is, therefore, an object of the present invention to provide a system which controls its motor for a predetermined period if engine stall occurs. This is achieved by an electric power steering system for a vehicle having a motor operatively connected to a steering system for reducing the steering effort, a steering torque sensor provided for detecting steering torque while the steering system is in its steering operation, engine stall detecting means for detecting engine stall condition, first control means responsive to the output signal of the steering torque sensor for producing an assist signal for driving the vehicle and second control means responsive to the output signal of the engine stall detecting means for controlling the operation of the first control means, so that when the engine stall occurs, the operation of the first control means is carried out for a predetermined period.

Other objects and features of this invention will become understood from the following description.

BRIEF DESCRIPTION OF THE DRAWINGS

The above and other objects and features of the present invention will become apparent from the following description of a preferred embodiment while referring to the accompany drawings in which.

DESCRIPTION OF THE PREFERRED EMBODIMENTS

Figure 1:
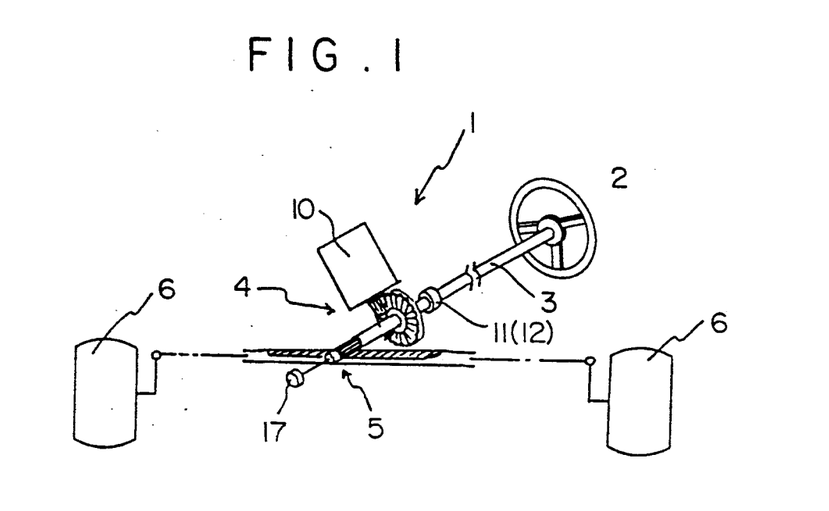
FIG. 1 is a perspective view schematically showing an electric power steering device in accordance with an embodiment of the present invention.

Referring now to the drawings, particularly to FIG. 1, the preferred embodiment of the steering structure 1 of the invention consists of a steering wheel 2 rigidly attached to a steering shaft 3, a power-assisted mechanism 4, and rack-and-pinion mechanism 5 which turns front wheels 6 via appropriate connections in response to movements of the steering wheel 2.

Figure 2:
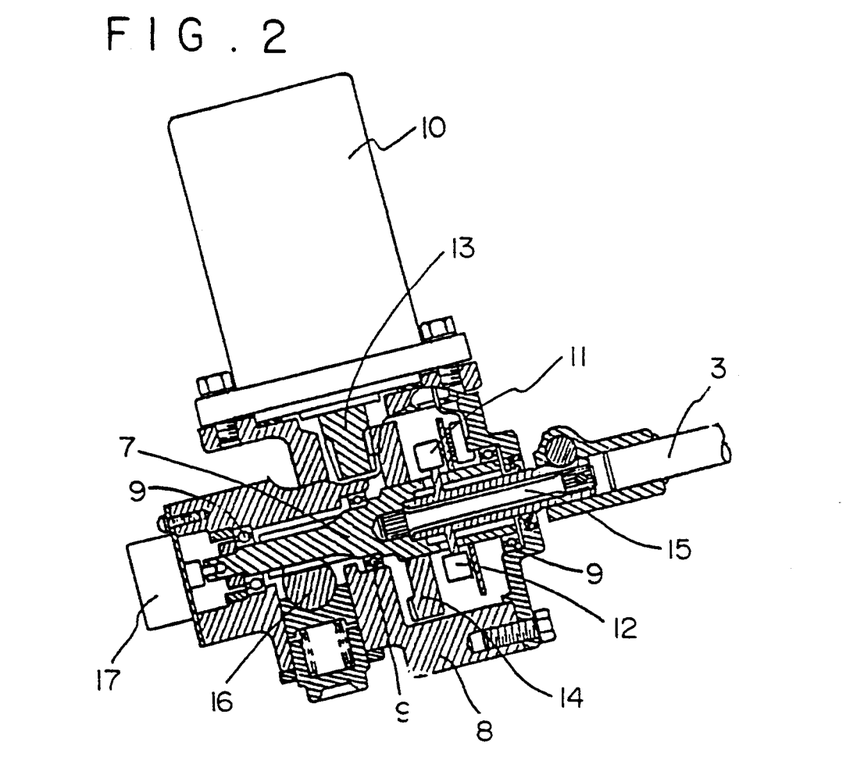
FIG. 2 is an enlarged sectional view showing a power-assisted mechanism as used in the present invention.

Referring to FIG. 2, the power-assisted mechanism 4 consists of a pinion gear shaft 7 rotatably mounted in a housing 8 by bearings 9, an electric motor 10 mounted on the housing 8, and two steering torque sensors 11 and 12 for measuring the torsion torque of the steering shaft 3.

A bevel gear 13 is connected on the end of output shaft of the electric motor 10, and is engaged with a reduction gear 14 integrated with the pinion gear shaft 7. The rotation of the electric motor 10 is transmitted to the pinion gear shaft 7 via the bevel gear 13 and the reduction gear 14.

The pinion gear shaft 7 is connected to the end of the steering shaft 3 by a torsion bar 15. The steering torque sensors 11 and 12 are located between the pinion gear shaft 7 and the steering shaft 3 in parallel with the torsion bar 15. The pinion gear shaft 7 is engaged to a rack bar 16 of the rack-and-pinion mechanism 5. A steering angle sensor 17 is connected to the end of the pinion gear shaft 7.

Figure 3:
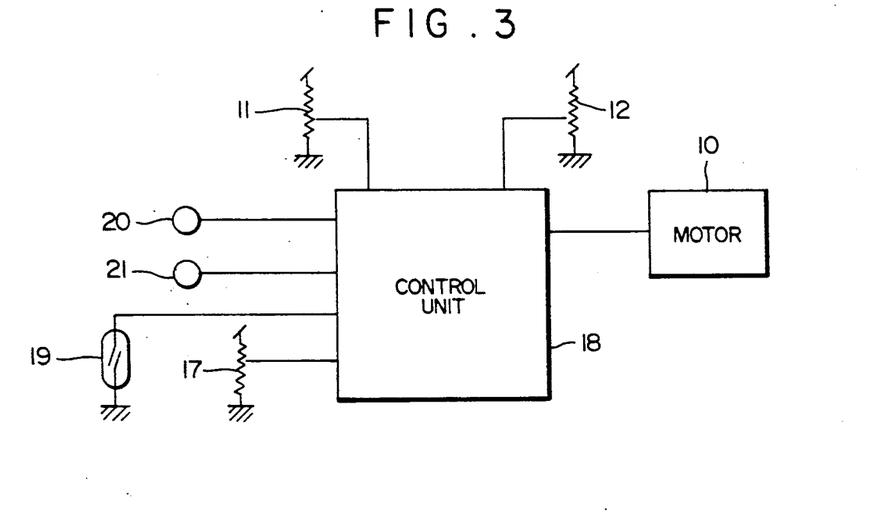
FIG. 3 is a block schematic diagram of the control system used in the present invention.

As shown in FIG. 3, the motor 10 is controlled by a signal from a control unit 18 including a micro computer or processor. The control unit 18 detects signals from the steering torque sensors 11 and 12, the steering angle sensor 17, a vehicle speed sensor 19, an ignition key switch 20, and an alternator output level sensor 21 for detecting the output level of an engine driven alternator.

Figure 4:
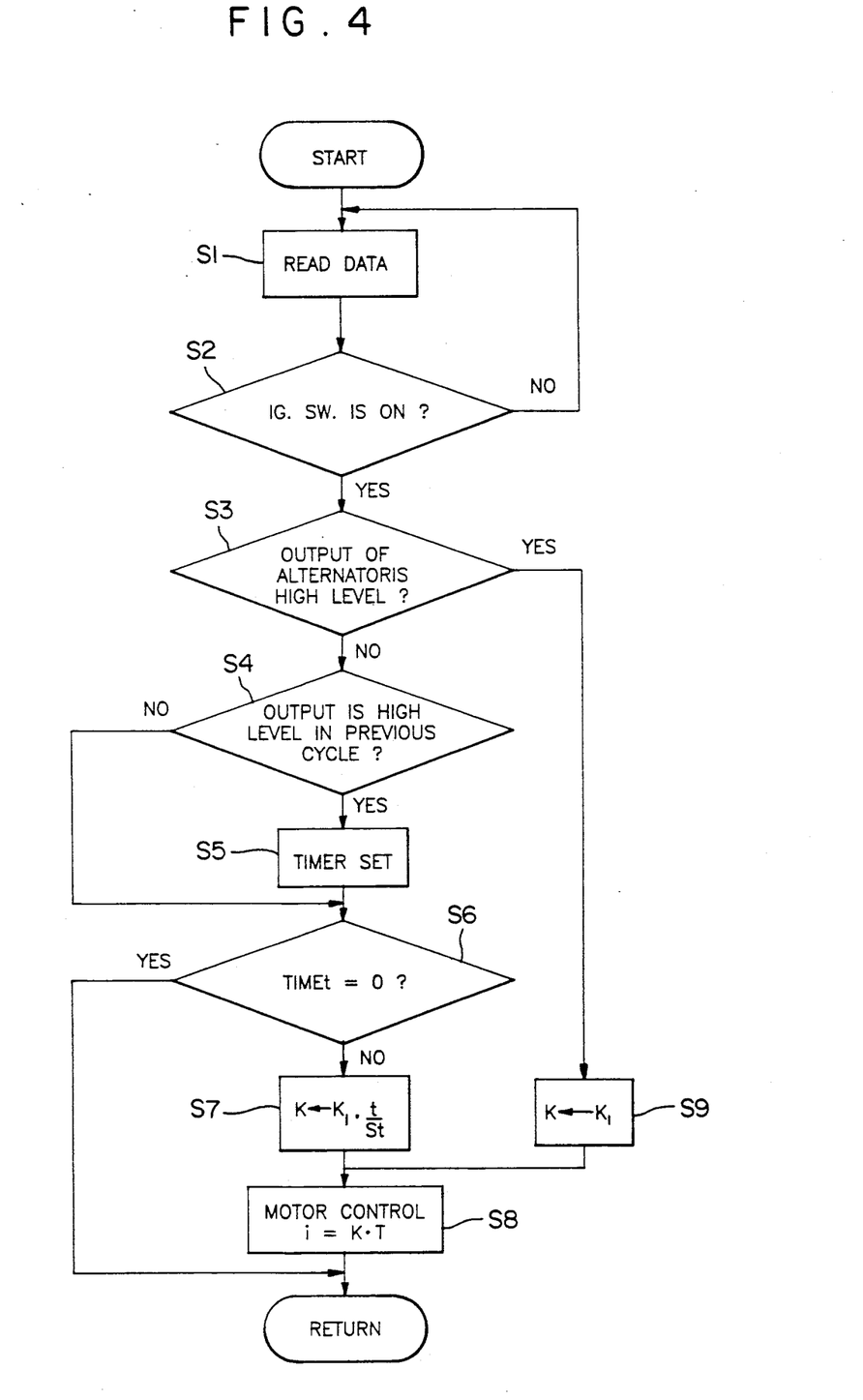
FIG. 4 is a flow chart showing the operation of the control unit according to a first embodiment of the present invention.

Control by the control unit 18 will be described in detail with reference to the flow chart of FIG. 4. In the following description, the reference symbol "S" means "Step".

The signals of the steering torque sensor 11 and 12, the steering angle sensor 17, the vehicle speed sensor 19, the ignition key switch 20 and the alternator output level sensor 21 are read in S1. A determination is made whether the ignition key switch 20 is turned on or not in S2. If the ignition switch 20 is on a determination is made as to whether the output of the alternator is at a high level or not in S3.

If the alternator output is not at a high level, a determination is made as to whether or not the output of the alternator was at a high level in previous cycle (or previous decision) in S4. If the output was at a high level in the previous cycle, a timer is set to St in S5. A determination is made whether or not the time t of the timer has been counted down to zero in S6.

If the time t is not zero, the control ratio K is calculated in S7 as:

$$K = K_1 \times t/St,$$

wherein $K_1$ is predetermined constant.

The motor control value i is controlled in S8 as:

$$i = K \times T,$$

wherein i is an electrical current value, and T is a steering torque.

In S6, if the time t is zero, the motor 10 is not controlled. If the output of the alternator is at a high level in S3, the control ratio K is set to $K_1$ in S9, and the motor 10 is controlled in S8.

Figure 5:
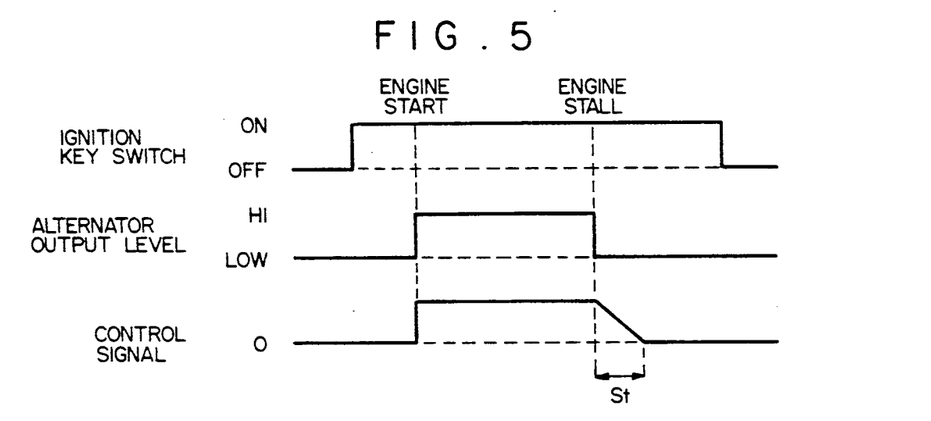
FIG. 5 is a timing chart showing the operation of the first embodiment of the present invention.

In operation, when the engine is started, the high level output of the alternator is generated and the control of the motor 10 is started. As shown in FIG. 5, if engine stall occurs, the output of the alternator is returned to the low level, but the control of the motor 10 is carried out by the control unit until the time t of the timer is counted down from St to zero. In this operation, the current value of the motor 10 is decreased gradually. Therefore, the consumption of the battery power goes down and the operation feeling of drivers is improved when the control of the motor 10 is stopped.

Figure 6:
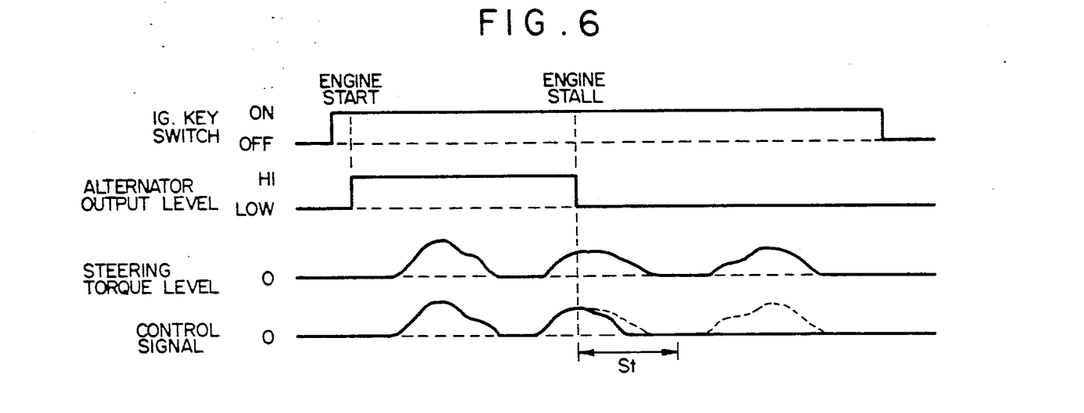
FIG. 6 is a detail timing chart of the first embodiment of the present invention corresponding to FIG. 5.

For convenience of explanation and to make understanding easy, FIG. 5 shows a simplified control signal. However, an actual control signal is illustrated in more detail in FIG. 6. A solid line of the control signal's timing chart in FIG. 6 shows the actual control signal. The actual control signal is proportional to steering torque, i.e., i (control signal) = K × T (steering torque). While the signal of alternator output level is at a high level, the actual control signal equals $K_1 \times T$. On the other hand, after the signal of alternator output level turns from a high level to a low level, the actual control signal equals $K_1 \times T \times (t/St)$. In FIG. 6, a broken or dotted line of the control signal timing chart shows a value of $K_1 \times T$ for comparison.

Figure 7:
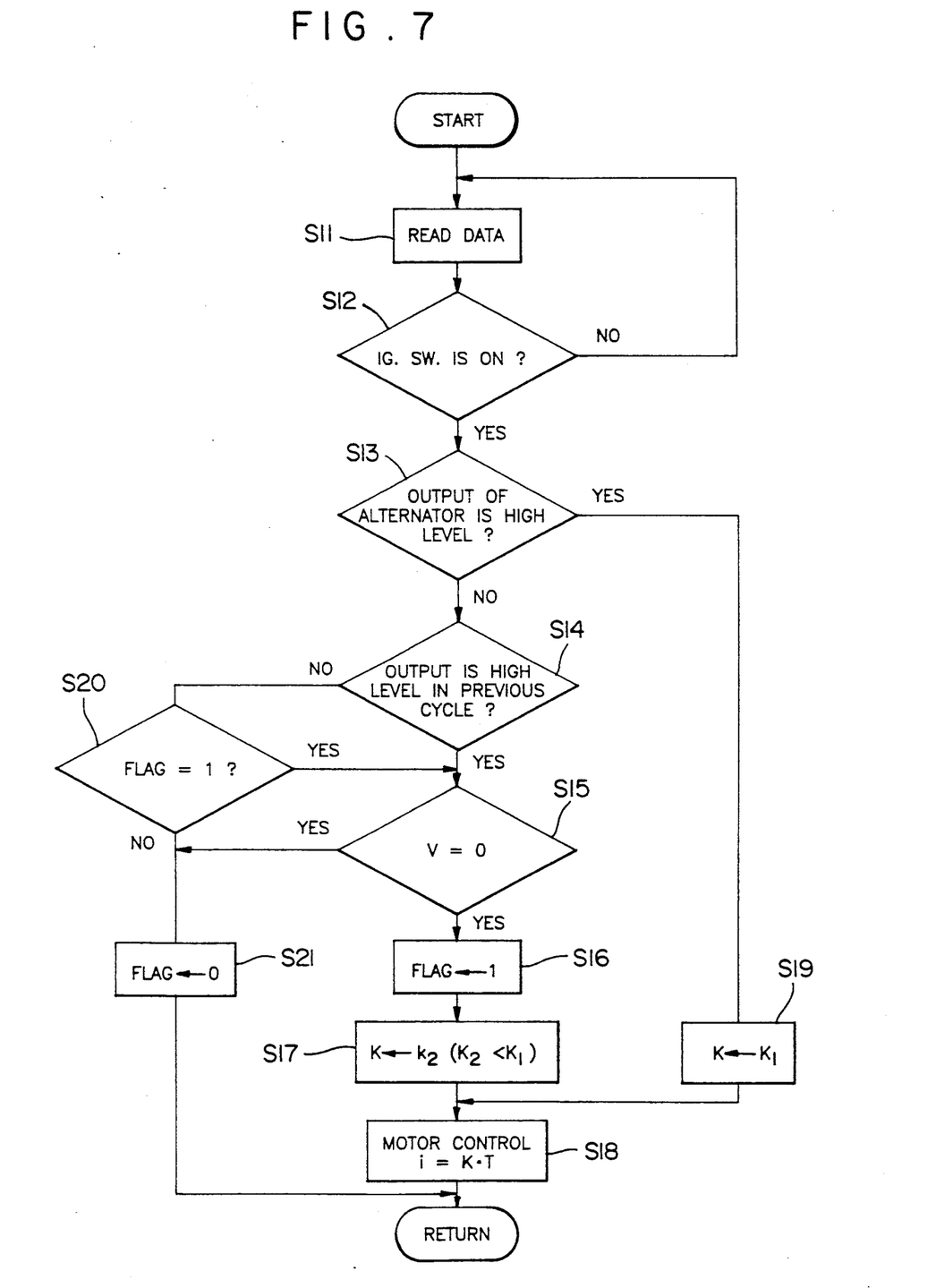
FIG. 7 is a flow chart showing the operation of the control unit according to a second embodiment of the present invention.

FIG. 7 shows an operation of the control unit 18 according to a second embodiment. The signals of the steering torque sensors 11 and 12, the steering angle sensor 17, the vehicle speed sensor 19, the ignition key switch 20 and the alternator output level sensor 21 are read in S11. A determination is made whether the ignition key switch 20 is turned on or not in S12. If the ignition switch 20 is on, a determination is made whether the output of the alternator is at a high level or not in S13.

If the output is not at a high level, a determination is made as to whether or not the output of the alternator was at a high level in the previous cycle (or previous decision) in S14. If the output was at a high level in the previous cycle, a determination is made as to whether the vehicle speed is zero or not in S15. If the vehicle speed is not zero, the flag "1" is set in S16.

The control ratio K is set to $K_2$ (smaller than $K_1$) in S17 and the motor is controlled in S18 as:

$$i = K \times T$$

If the output of the alternator is at a high level in S13, the control ratio K is set to $K_1$ (larger than $K_2$) in S19.

In S14, if it is determined that the output was not at a high level in the previous cycle, a determination is made whether the flag "1" is set or not in S20. If, in step S20, it is determined that the flag "1" is set the determination is made in S15. If the vehicle speed is determined to be zero in step S15, the flag "0" is set in S21, and the motor 10 is not controlled.

Figure 8:
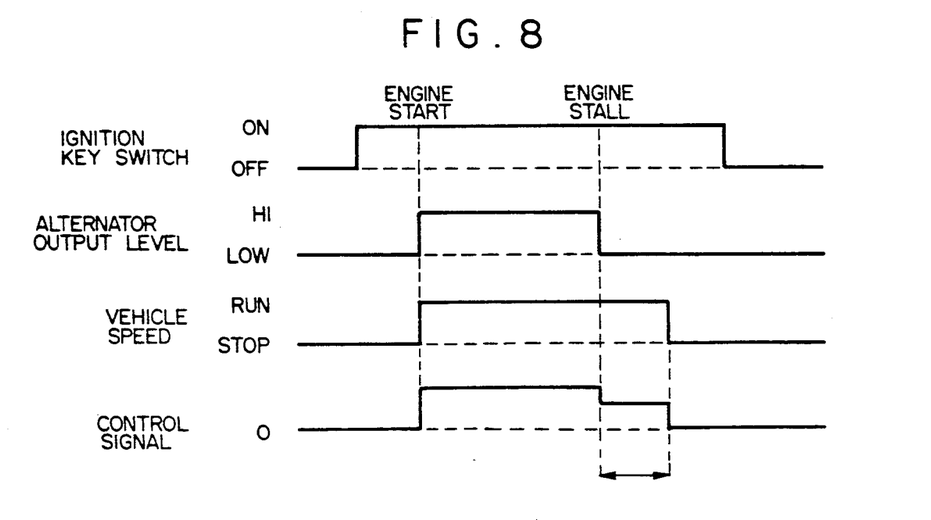
FIG. 8 is a timing chart showing the operation of the second embodiment of the present invention.

In operation, when the engine is started, the high level output of the alternator is generated and the control of the motor is started. If engine stall occurs in the vehicle stopping condition, the control of the motor is stopped. As shown in FIG. 8, if the engine stall occurs in the vehicle running condition, the control of the motor 10 is carried out by the control unit until the vehicle is stopped. In this operation the current value of the motor 10 is smaller than that in the engine operating condition. Therefore, the consumption of the battery power is reduced.

Figure 9:
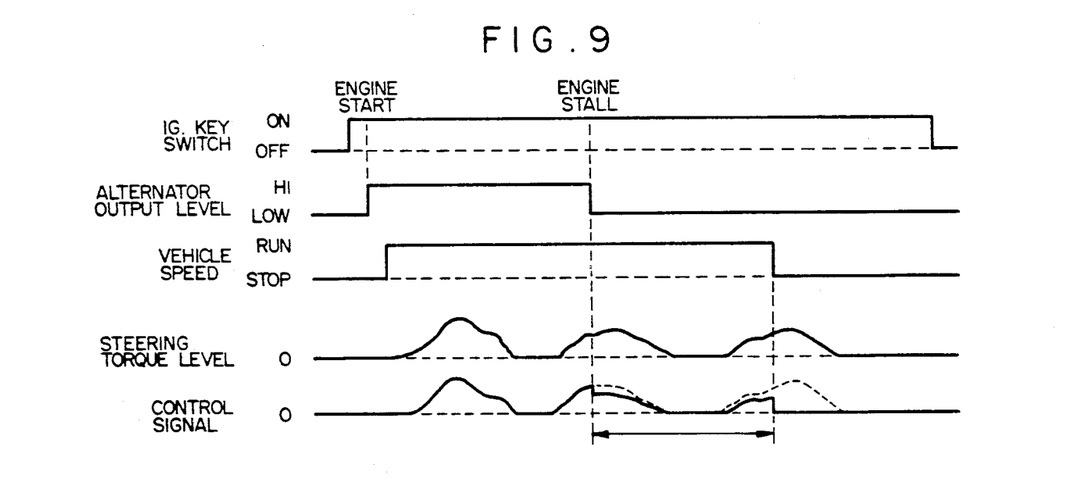
FIG. 9 is a detail timing chart of the second embodiment of the present invention corresponding to FIG. 8.

Similar to FIG. 5 for the first embodiment, FIG. 8 is a simplified representation of the control signal for the second embodiment to make explanation and understanding easy. However, an actual control signal is illustrated in FIG. 9. The solid line of the control signal timing chart in FIG. 9 shows the actual control signal. In FIG. 9, while the signal of alternator output level is at a high level the control signal equals $K_1 \times T$. On the other hand, after the signal of alternator output level turns from a high level to a low level and until the signal representing vehicle speed shows that the vehicle has stopped the control signal equals $K_2 \times T$. After the vehicle stops, the control signal equals zero. In FIG. 9, a broken or dotted line on the control signal timing chart shows a value of $K_1 \times T$ for comparison.

Figure 10:
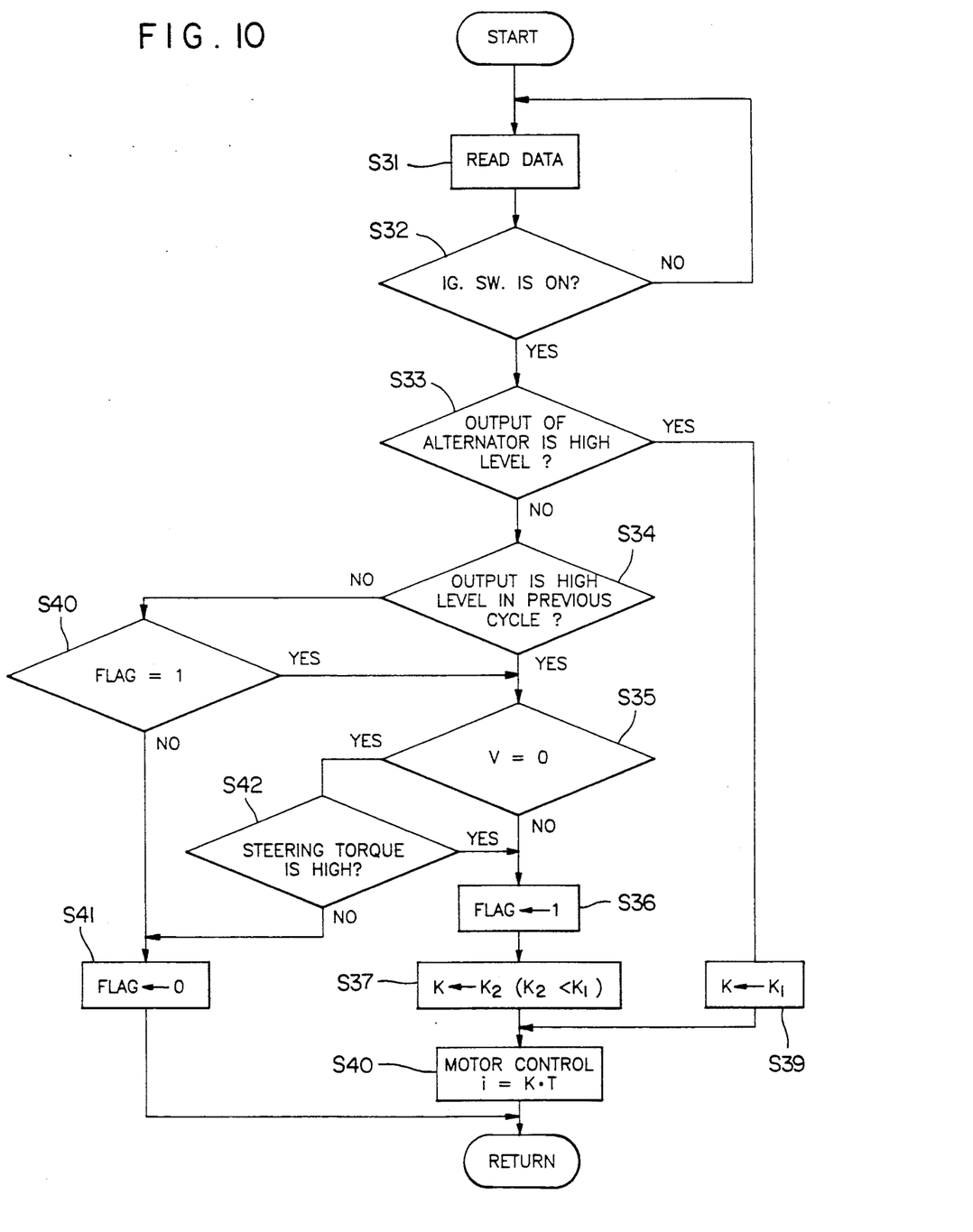
FIG. 10 is a flow chart showing the operation of the control unit according to a third embodiment of the present invention.

FIG. 10 shows the operation of the control unit 18 according to a third embodiment. The signals of the steering torque sensors 11 and 12, the steering angle sensor 17, the vehicle speed sensor 19, the ignition key switch 20 and the alternator output level sensor 21 are read in S31. A determination is made as to whether the ignition key switch 20 is turned on or not in S32. If the ignition switch 20 is on, a determination is made whether the output of the alternator is at high level or not in S33.

If it is determined in step S33 that the output is not at a high level, a determination is made as to whether or not the output of the alternator was at a high level in the previous cycle (or previous decision) in S34. If the output was at a high level in the previous cycle, a determination is made as to whether or not the vehicle speed is zero in S35. If the vehicle speed is not zero, the flag "1" is set in S36.

The control ratio K is set to $K_2$ (smaller than $K_1$) in S37 and the motor is controlled in S38 as:

$$i = K \times T$$

If the output of the alternator is determined to be at a high level in S33, the control ratio K is set to $K_1$ (larger than $K_2$) in S39.

In S34, if it is determined that the output was not at a high level in the previous cycle, a determination is made as to whether or not the flag "1" is set in S40. If the flag "1" is set, as to whether or not a determination is made in S35. If the vehicle speed is zero now, a determination is made as to whether or not steering torque is at a high level in S42. Alternatively, the decision in S42 could be substituted by a decision as to whether the steering angle is large or not. If the steering torque is at a high level, the flag is set to "1" in S36. If the steering torque is not at a high level, the flag is set to "0" in S41, and the motor 10 is not controlled.

Figure 11:
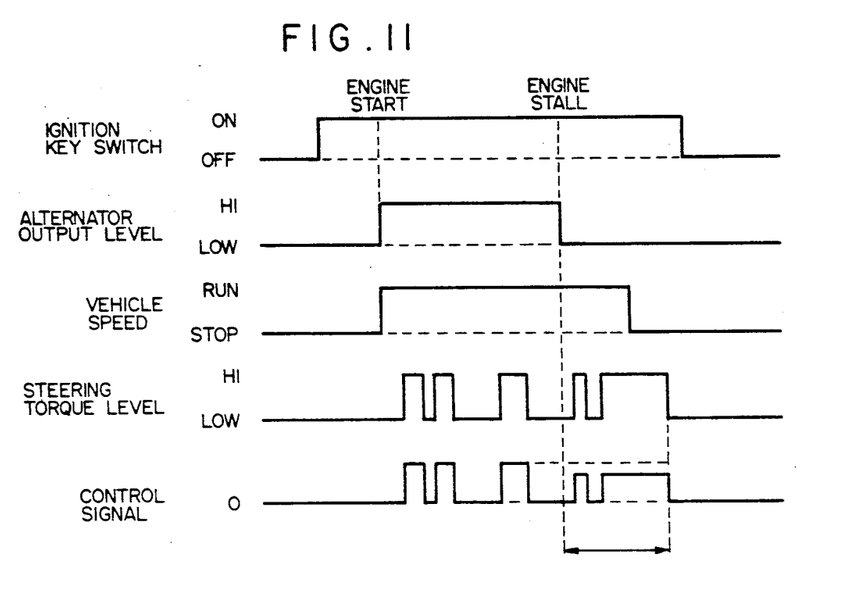
FIG. 11 is a timing chart showing the operation of the third embodiment of the present invention; and, FIG. 12 is a detail timing chart of the third embodiment of the present invention corresponding to FIG. 11.

In operation, when the engine is started, the high level output of the alternator is generated and the control of the motor is started. If engine stall occurs in the vehicle stopping condition, the control of the motor is stopped. As shown in FIG. 11, if engine stall occurs in the vehicle running condition and if the steering torque is still high after the vehicle is stopped, the control of the motor 10 is carried out by the control unit until the steering torque goes down to a low level. In this operation, the current value of the motor 10 is smaller than that in the engine operating condition. Therefore, the consumption of the battery power is reduced.

Figure 12:
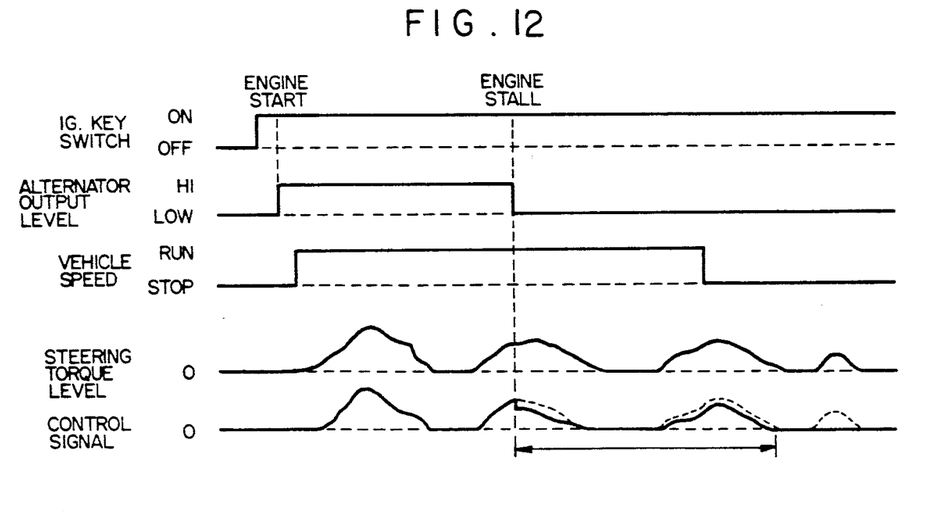

Similar to FIG. 5 for the first embodiment, FIG. 11 is a simplified representation of the control signal for the third embodiment to make explanation and understanding easy. However, an actual control signal is illustrated in FIG. 12. The solid line of the control signal timing chart in FIG. 12 shows the actual control signal. In FIG. 12, while the signal of alternator output level is at a high level the control signal equals $K_1 \times T$. On the other hand, after the signal of alternator output level turns from a high level to a low level and until the signal representing vehicle speed shows that the vehicle has stopped and the signal of steering torque level shows that the torque is zero or a predetermined small value, the control signal equals $K_2 \times T$. After vehicle stops and steering operation stops, the control signal equals zero. In FIG. 12, a broken or dotted line of the control signal timing chart shows a value of $K_1 \times T$ for comparison.

From the above description, it will be understood that according to the invention, safety is greatly improved, because the control of the electric power steering system is carried out if engine stall occurs.

The invention has thus been shown and described with reference to specific preferred embodiments; however, it should be noted that the invention is in no way limited to the details of the illustrated and described preferred embodiments, but changes and modification may be made by one skilled in the art without departing from the spirit and scope of the appending claims.

What is claimed is:

1. An electric power steering system for steering wheels of a vehicle steerable by a steering wheel steerably connected thereto, comprising:

a motor operatively connected to the steering system for reducing steering effort, a steering torque sensor means for detecting steering torque in the steering system during a steering operation, ignition switch condition detecting means for detecting if an ignition switch for starting the vehicle is in one of an on condition and an off condition, engine stall detecting means for detecting an engine stall condition, and control means, responsive to detection by the ignition switch condition detecting means that said ignition switch is in said on condition and to detection by the engine stall detecting means of an engine stall, for operating and then stopping operation of the motor after a predetermined period determined by said control means has passed even if said ignition switch remains in said on condition.

2. The system according to claim 1, wherein said control means includes timer means for setting said predetermined period and counting down to zero time.

3. The system according to claim 1, and further comprising a vehicle speed sensor for detecting vehicle speed, and wherein said control means continues operation of said motor until the vehicle is stopped.

4. The system according to claim 1, wherein said control means continues operation of said motor until the steering torque is lowered.

5. The system according to claim 1, and further comprising a steering angle sensor for detecting a turning angle of the steering wheel, wherein said control means continues operation of said motor until the turning angle becomes small.

6. The system according to claim 1, wherein said control means controls said motor so that an assist signal for driving the motor in the engine stall condition is smaller than an assist signal for driving the motor in an engine operation condition but larger than zero.

7. The system according to claim 6, wherein said control means controls the operation of the motor by reducing said assist signal gradually in the engine stall condition.

8. The system according to claim 7, wherein said motor is an electric motor and said assist signal is a current value for controlling the motor.

9. The system according to claim 1, and further comprising an alternator output level sensor for detecting an output level of an engine driven alternator, and wherein said ignition switch condition detecting means is an ignition key switch sensor, said engine stall detecting means detecting the engine stall condition in response to outputs of said alternator output level sensor and said ignition key switch sensor, said output level of said engine driven alternator changing from a high level to a low level when said ignition switch is turned on.

* * * * *